United States Patent
Cecil

(10) Patent No.: US 10,273,945 B2
(45) Date of Patent: Apr. 30, 2019

(54) MECHANICAL FUEL PUMP DEACTIVATION

(71) Applicant: CUMMINS INC., Columbus, IN (US)

(72) Inventor: Adam C. Cecil, Columbus, IN (US)

(73) Assignee: Cummins Inc., Columbus, IN (US)

( * ) Notice: Subject to any disclaimer, the term of this patent is extended or adjusted under 35 U.S.C. 154(b) by 631 days.

(21) Appl. No.: 14/448,176

(22) Filed: Jul. 31, 2014

(65) Prior Publication Data

US 2016/0032878 A1 Feb. 4, 2016

(51) Int. Cl.

| F04B 1/04 | (2006.01) |
|---|---|
| F04B 9/04 | (2006.01) |
| F04B 27/04 | (2006.01) |
| F01L 13/00 | (2006.01) |
| F01B 31/24 | (2006.01) |
| F02M 59/10 | (2006.01) |
| F02M 59/02 | (2006.01) |
| F02M 39/02 | (2006.01) |
| F02M 43/02 | (2006.01) |
| F01L 1/14 | (2006.01) |
| F02M 43/00 | (2006.01) |
| F02M 59/38 | (2006.01) |
| F02D 19/06 | (2006.01) |
| F01L 1/08 | (2006.01) |

(52) U.S. Cl.
CPC ............ *F04B 1/0435* (2013.01); *F01B 31/24* (2013.01); *F01L 13/0005* (2013.01); *F02D 19/0684* (2013.01); *F02M 39/02* (2013.01); *F02M 43/02* (2013.01); *F02M 59/027* (2013.01); *F02M 59/102* (2013.01); *F04B 9/042* (2013.01); *F04B 27/0428* (2013.01); *F04B 27/0437* (2013.01); *F01L 1/08* (2013.01); *F01L 1/146* (2013.01); *F01L 13/0036* (2013.01); *F01L 2105/00* (2013.01); *F01L 2820/041* (2013.01); *F02D 19/0649* (2013.01); *F02M 43/00* (2013.01); *F02M 59/38* (2013.01); *Y02T 10/36* (2013.01)

(58) Field of Classification Search
CPC ... F01L 13/0005; F01L 1/146; F01L 2105/00; F04B 1/0435; F04B 9/042; F04B 27/0428; F04B 27/0437; F01B 31/24
USPC ............. 417/216, 286, 426; 123/90.1, 90.15, 123/90.16
See application file for complete search history.

(56) References Cited

U.S. PATENT DOCUMENTS

| 5,775,203 | A | 7/1998 | Osborn et al. | |
|---|---|---|---|---|
| 6,076,491 | A * | 6/2000 | Allen ................ | F01L 1/143 123/198 F |
| 6,866,025 | B1 | 3/2005 | Maass | |
| 7,552,720 | B2 | 6/2009 | Borg et al. | |
| 7,792,629 | B2 * | 9/2010 | Sczomak ........... | F04B 17/05 123/446 |
| 8,061,329 | B2 | 11/2011 | Pursifull et al. | |
| 8,342,151 | B2 | 1/2013 | Gwidt et al. | |

(Continued)

FOREIGN PATENT DOCUMENTS

DE 102007059731 7/2008

*Primary Examiner* — Peter J Bertheaud
(74) *Attorney, Agent, or Firm* — Faegre Baker Daniels LLP

(57) ABSTRACT

A mechanical fuel pump is disclosed for delivering fuel to an engine of a vehicle, the mechanical fuel pump having an activated configuration and a deactivated configuration. A dual fuel system and method are also disclosed for use with the mechanical fuel pump.

9 Claims, 4 Drawing Sheets

(56) References Cited

U.S. PATENT DOCUMENTS

2004/0101418 A1* 5/2004 Roth .................. F02M 59/102
                                                     417/221

* cited by examiner

MECHANICAL FUEL PUMP DEACTIVATION

FIELD OF THE DISCLOSURE

The present disclosure relates to a fuel system including a fuel pump for an internal combustion engine. More particularly, the present disclosure relates to a fuel pump having a deactivating element, and to a method for using the same.

BACKGROUND OF THE DISCLOSURE

Modern gasoline engines are migrating from port injection fuel systems to direct injection fuel systems. A port injection fuel system is usually associated with low fuel pressure that can accommodate an electric fuel pump. By contrast, a direct injection fuel system is usually associated with high fuel pressure that requires a mechanical fuel pump. The mechanical fuel pump may be driven by a mechanical connection to a camshaft of the engine, so the mechanical fuel pump may operate whenever the camshaft of the engine operates, which may lead to noise, vibration and harshness (NVH), parasitic losses, and fuel warming.

SUMMARY

The present disclosure provides a mechanical fuel pump for delivering fuel to an engine of a vehicle, the mechanical fuel pump having an activated configuration and a deactivated configuration. The present disclosure also provides a dual fuel system and method for use with the mechanical fuel pump.

According to an embodiment of the present disclosure, a fuel pump is disclosed including a rotatable camshaft including at least one lobe, a pump housing defining a pump chamber, a pump piston reciprocally mounted in the pump chamber, and a deactivating element operatively positioned between the at least one lobe and the pump piston, the deactivating element having a first configuration wherein the deactivating element transfers movement of the at least one lobe to the pump piston to deliver fuel to an engine, and a second configuration wherein the deactivating element absorbs movement of the at least one lobe to deactivate the fuel pump.

According to another embodiment of the present disclosure, a fuel pump is disclosed including a rotatable camshaft including at least one lobe, a pump housing defining a pump chamber, a pump piston reciprocally mounted in the pump chamber, and a deactivating element that uncouples the at least one lobe from the pump piston to deactivate the fuel pump.

According to yet another embodiment of the present disclosure, a method is disclosed for delivering fuel to an engine of a vehicle, the method including rotating a camshaft including at least one lobe, operating a fuel pump by transferring movement of the at least one lobe to a pump piston, and deactivating the fuel pump by absorbing movement of the at least one lobe.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
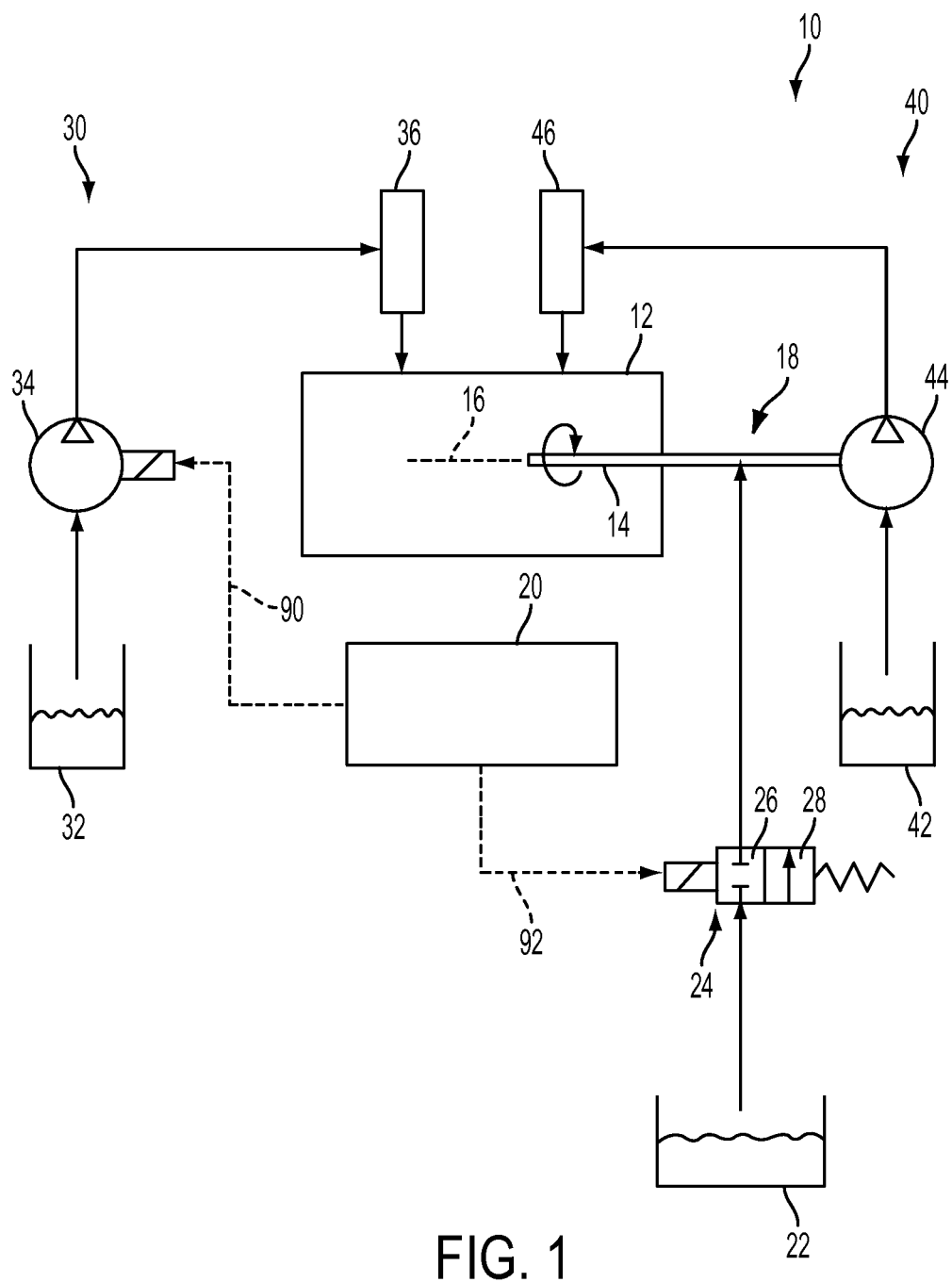
FIG. 1 is a schematic view of a fuel system of the present disclosure including a first fuel system with a first fuel pump and a second fuel system with a second fuel pump.

Referring initially to FIG. 1, a fuel system 10 is provided for delivering fuel to an internal combustion engine 12 of a vehicle. Engine 12 includes a driveshaft or camshaft 14 that rotates about an axis 16 to control the timing of an intake stroke and/or an exhaust stroke of engine 12. Fuel system 10 includes a controller 20 that is programmed to operate fuel system 10. Controller 20 may also be programmed to operate other components of the vehicle, including engine 12.

The illustrative fuel system 10 of FIG. 1 is a dual fuel system including a first fuel system 30 and a second fuel system 40. The first fuel system 30 of FIG. 1 includes a first fuel source 32, a first fuel pump 34, and a first fuel injector 36 in fluid communication with engine 12. The second fuel system 40 of FIG. 1 includes a second fuel source 42, a second fuel pump 44, and a second fuel injector 46 in fluid communication with engine 12.

The first fuel system 30 may differ from the second fuel system 40. For example, the first fuel system 30 may be a low pressure system, whereas the second fuel system 40 may be a high pressure system. As another example, the first fuel source 32 of the first fuel system 30 may supply a low octane fuel to engine 12, whereas the second fuel source 42 of the second fuel system 40 may supply a high octane fuel to engine 12. However, it is also within the scope of the present disclosure that the first fuel source 32 and the second fuel source 42 may be a common fuel source to supply a single fuel type to engine 12. As yet another example, the first fuel pump 34 of the first fuel system 30 may be an electric pump, whereas the second fuel pump 44 of the second fuel system 40 may be a mechanical pump that is driven by camshaft 14 of engine 12. As still yet another example, the first fuel injector 36 of the first fuel system 30 may be a port injection device that injects low pressure fuel into an air intake manifold (not shown) of engine 12, whereas the second fuel injector 46 of the second fuel system 40 may be a direct injection device that injects high pressure fuel directly into a cylinder (not shown) of engine 12.

As discussed further below, a mechanical coupling 18 between the camshaft 14 of engine 12 and the second fuel pump 44 may be controlled using a suitable pressure source. In the illustrated embodiment of FIG. 1, the pressure source 22 is pressurized fluid, such as pressurized lubricating oil, for example. The pressurized fluid from the source 22 may be directed to the mechanical coupling 18 of the second fuel pump 44 and also to other components of the vehicle, including engine 12. The flow of pressurized fluid from the source 22 to the mechanical coupling 18 of the second fuel pump 44 may be controlled using a solenoid flow control valve 24 having a normally closed position 26 and an open position 28. When the flow control valve 24 is in the closed position 26, as shown in FIG. 1, pressurized fluid from the source 22 is prevented from reaching the mechanical coupling 18 of the second fuel pump 44. When the flow control valve 24 is energized and moved to the open position 28, pressurized fluid from the source 22 is directed to the mechanical coupling 18 of the second fuel pump 44.

Referring still to FIG. 1, controller 20 may operate the first fuel system 30 independently of the second fuel system 40 to provide a dual fuel strategy. In FIG. 1, controller 20 is shown in communication with the first fuel pump 34 via a first signal path 90 to send appropriate signals to operate the first fuel system 30. Controller 20 is also shown in communication with the flow control valve 24 associated with the second fuel pump 44 via a second signal path 92 to send appropriate signals to operate the second fuel system 40. It is also within the scope of the present disclosure that controller 20 may communicate with engine 12, the first fuel injector 36, the second fuel injector 46, and/or other components of the vehicle via suitable signal paths.

Figure 2:
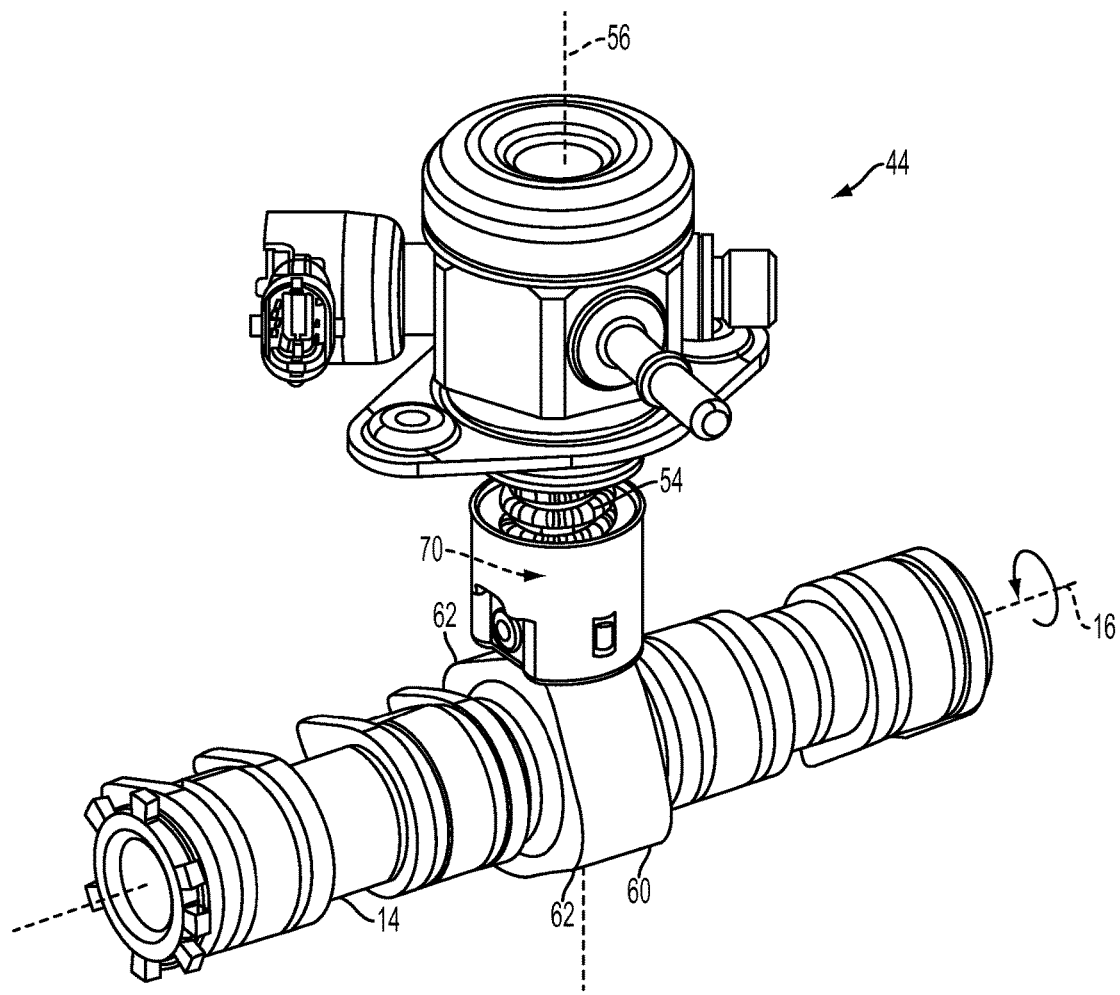
FIG. 2 is a perspective view of the second fuel pump of FIG. 1.
Figure 3:
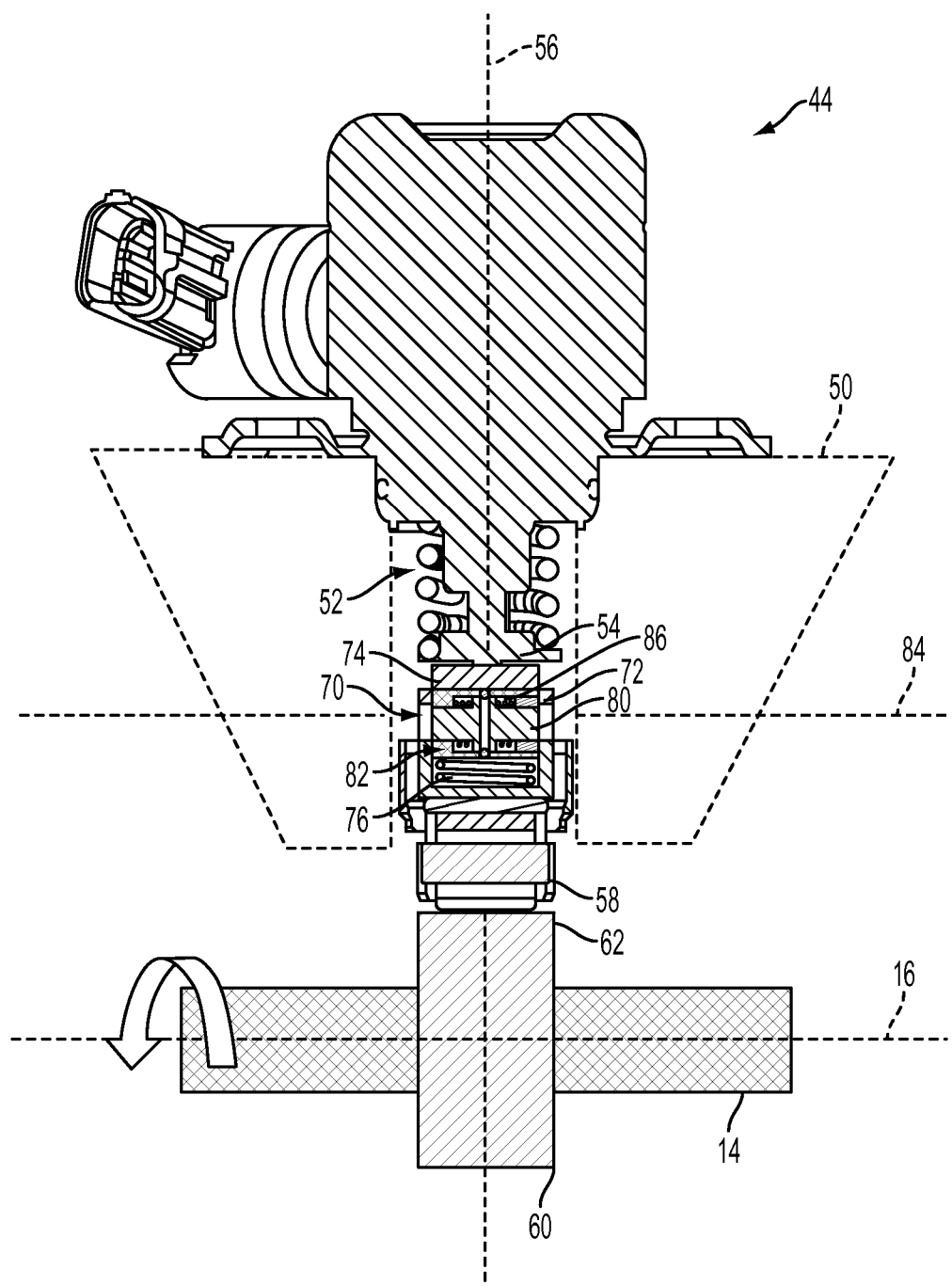
FIG. 3 is a cross-sectional view of the second fuel pump of FIG. 2 showing a deactivation element.

An exemplary embodiment of the second fuel pump 44 is shown in FIGS. 2-3. The illustrative fuel pump 44 of FIG. 3 includes a pump housing 50 defining a pump chamber 52 and a pump piston 54 mounted in the pump chamber 52 for reciprocal movement along a longitudinal axis 56. As discussed above with reference to FIG. 1, the second fuel pump 44 may be driven by camshaft 14 of engine 12. Therefore, the illustrative fuel pump 44 also includes a lobe follower 58, which may be a bucket-style roller, to interact with camshaft 14. Camshaft 14 includes a cam 60 having one or more lobes 62 (e.g., a tri-lobe cam or a quad-lobe cam). In use, as camshaft 14 rotates about axis 16, cam 60 also rotates about axis 16. Lobe follower 58 of fuel pump 44 moves up and down repeatedly across lobes 62 of the rotating cam 60, which causes pump piston 54 to also move up and down repeatedly along the longitudinal axis 56 to operate the fuel pump 44.

Between the pump piston 54 and the lobe follower 58, the fuel pump 44 further includes a deactivating element 70 to selectively deactivate the fuel pump 44. The illustrative deactivating element 70 includes an outer body 72 and an inner body 74, which may be arranged in the pump chamber 52 along the same longitudinal axis 56 as the pump piston 54. The outer body 72 may be keyed to the inner body 74 to prevent relative rotation therebetween. In FIG. 3, the outer body 72 is shown contacting the adjacent lobe follower 58 and the inner body 74 is shown contacting the adjacent pump piston 54, but this arrangement may vary. A longitudinal spring 76 may be provided between the outer body 72 and the inner body 74 to maintain contact with the adjacent components. It is also within the scope of the present disclosure that the outer body 72 may be fixed to or integrally formed with the adjacent lobe follower 58 and/or that the inner body 74 may be fixed to or integrally formed with the adjacent pump piston 54.

The illustrative deactivating element 70 further includes one or more internal locking pins 80 contained in a throughbore 82 of the inner body 74. The locking pins 80 may be configured for movement in the throughbore 82 along an axis 84 that is transverse or perpendicular to the longitudinal axis 56.

Figure 4:
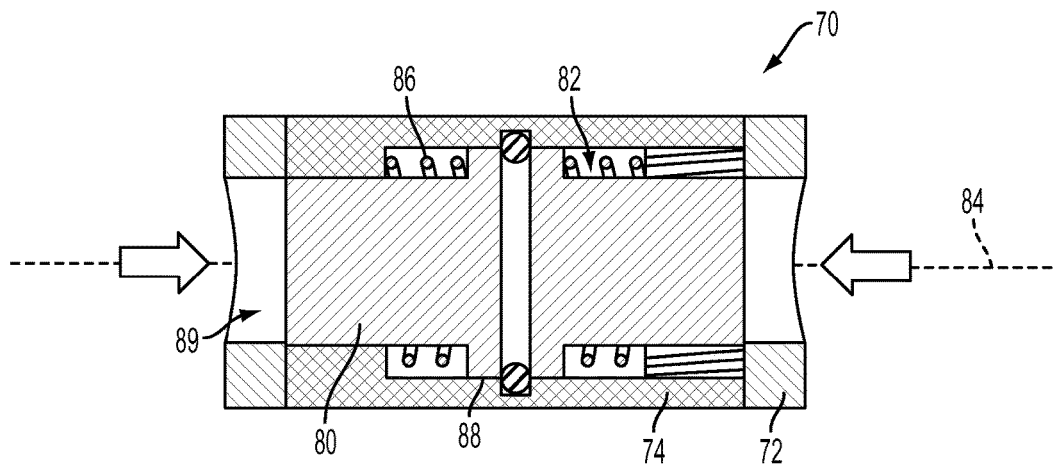
FIG. 4 is a cross-sectional view of the deactivation element of FIG. 3 shown in an unlocked or collapsible configuration.

As shown in FIG. 4, the deactivating element 70 may have an unlocked or collapsible configuration that allows for relative longitudinal movement between the outer body 72 and the inner body 74. In this unlocked or collapsible configuration, movement of the outer body 72 is absorbed by the longitudinal spring 76 to collapse the deactivating element 70 without transferring such movement to the inner body 74. In the illustrated embodiment of FIG. 4, the unlocked configuration is achieved with a biasing spring 86 that forces a head 88 of each corresponding locking pin 80 radially inwardly along axis 84 and away from outer body 72 into an unlocked position. The locking pins 80 may be biased in this unlocked position under the force of the biasing springs 86.

Figure 5:
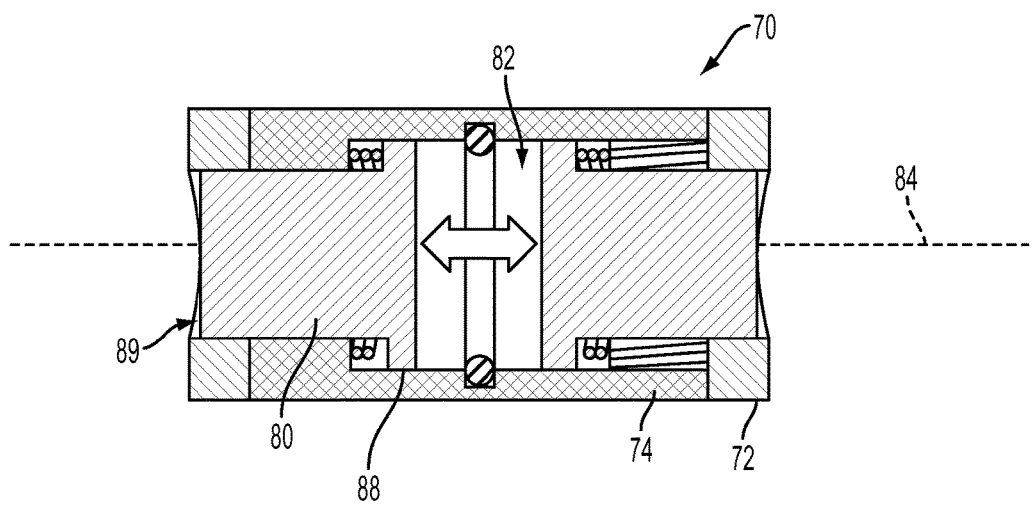
FIG. 5 is another cross-sectional view of the deactivation element of FIG. 3 shown in a locked or rigid configuration.

As shown in FIG. 5, the deactivating element 70 may also have a locked or rigid configuration that prevents relative longitudinal movement between the outer body 72 and the inner body 74. In this locked or rigid configuration, movement of the outer body 72 is transferred to the inner body 74. In the illustrated embodiment of FIG. 5, the locked configuration is achieved by selectively injecting pressurized fluid into the throughbore 82 of the inner body 74 via an injection port (not shown). As discussed above with respect to FIG. 1, this pressurized fluid may be received by opening the flow control valve 24 that communicates with the pressurized fluid source 22. When the pressure inside throughbore 82 of the inner body 74 is sufficient to overcome biasing springs 86, the locking pins 80 move radially outwardly along axis 84 and into corresponding receptacles 89 in the outer body 72 into a locked position, thereby achieving a locked engagement with the outer body 72.

In FIGS. 4 and 5, the locking pins 80 are biased in the unlocked position under the force of biasing springs 86 and are selectively moved to the locked position by opening the flow control valve 24 (FIG. 1). It is also within the scope of the present disclosure that the locking pins 80 may be biased in the locked position and selectively moved into the unlocked position.

Returning to FIG. 3, the fuel pump 44 may be mechanically deactivated by placing the deactivating element 70 in the unlocked or collapsible configuration (FIG. 4). In this unlocked or collapsible configuration, rotation of the cam 60 moves the lobe follower 58 and its adjacent outer body 72 of the deactivating element 70. However, this movement of the outer body 72 is absorbed by the deactivating element 70 rather than being transferred to the inner body 74. As a result, the inner body 74 and its adjacent pump piston 54 remain substantially stationary and avoid operating the fuel pump 44. Advantageously, mechanically deactivating the fuel pump 44 when operation of the fuel pump 44 is not needed may reduce noise, vibration and harshness (NVH), parasitic losses, and fuel warming.

The fuel pump 44 may be mechanically activated by placing the deactivating element 70 in the locked or rigid configuration (FIG. 5). In this locked or rigid configuration, rotation of the cam 60 moves the lobe follower 58 and its adjacent outer body 72 of the deactivating element 70. Because the outer body 72 is locked relative to the inner body 74, this movement of the outer body 72 is transferred to the inner body 74 as well as the adjacent pump piston 54, thereby operating the fuel pump 44 and delivering fuel to engine 12 (FIG. 1).

In use, controller 20 may control operation of the second fuel system 40 of FIG. 1 by mechanically deactivating and activating the corresponding fuel pump 44. According to an exemplary embodiment of the present disclosure, controller 20 may deactivate the fuel pump 44 when engine 12 is operating at or below a predetermined load, such as at or below 40% load, 50% load, 60% load, 70% load, or 80% load, for example. In embodiments where the deactivating element 70 is biased in the unlocked or collapsible configuration with the control valve 24 in the closed position 26, as shown in FIG. 1, controller 20 may deactivate the fuel pump 44 without taking action and without energizing the signal path 92. When engine 12 operates above the predetermined load, controller 20 may activate the fuel pump 44 to boost fuel to engine 12. In the illustrated embodiment of FIG. 1, controller 20 may activate the fuel pump 44 by energizing the signal path 92 to move the control valve 24 to the open position 28. In certain embodiments, this fuel boost from the second fuel system 40 may come in the form of high pressure, high octane fuel from the second fuel source 42 that is directly injected into engine 12 by the second fuel injection device 46 for increased load capacity during high load operations. Also, this fuel boost from the second fuel system 40 may supplement low pressure, low octane fuel from the first fuel source 32 that is directed into an air port of engine 12 by the first fuel injector 36 of the first fuel system 30.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel pump comprising:
   a rotatable camshaft including a lobe which protrudes from the camshaft and is immovable relative to the camshaft as the camshaft rotates through a plurality of revolutions;
   a pump housing defining a pump chamber;
   a pump piston mounted in the pump chamber for reciprocal movement; and
   a deactivating element operatively positioned between the lobe and the pump piston, the deactivating element having:
      a first configuration wherein the deactivating element transfers movement of the lobe to the pump piston to deliver fuel to an engine; and
      a second configuration wherein the deactivating element absorbs movement of the lobe, thereby causing the pump piston to remain substantially stationary and avoid operating the fuel pump during rotation of the camshaft through the plurality of revolutions.

2. The fuel pump of claim 1, wherein the deactivating element is rigid in the first configuration and collapsible in the second configuration.

3. The fuel pump of claim 1, wherein the deactivating element comprises:
   an outer body;
   an inner body; and
   at least one locking pin being movable between:
      a locked position corresponding to the first configuration, wherein the inner body moves with the outer body in the locked position; and
      an unlocked position corresponding to the second configuration, wherein the inner body moves relative to the outer body in the unlocked position.

4. The fuel pump of claim 3, wherein, in the unlocked position of the at least one locking pin, at least one spring forces the at least one locking pin radially inward and away from the outer body.

5. The fuel pump of claim 3, wherein the at least one locking pin is biased in the unlocked position.

6. The fuel pump of claim 3, wherein, in the locked position of the at least one locking pin, a pressurized fluid in the inner body forces the at least one locking pin radially outward and toward the outer body.

7. The fuel pump of claim 3, wherein the pump piston moves along a first axis and the at least one locking pin moves along a second axis transverse to the first axis.

8. The fuel pump of claim 1, further comprising a lobe follower coupled to the deactivating element to interact with the lobe of the rotatable camshaft.

9. A fuel pump comprising:
   a rotatable camshaft including a lobe which protrudes from the camshaft and is immovable relative to the camshaft as the camshaft rotates through a plurality of revolutions;
   a pump housing defining a pump chamber;
   a pump piston reciprocally mounted in the pump chamber; and
   a deactivating element that uncouples the lobe from the pump piston to cause the pump piston to remain substantially stationary and avoid operating the fuel pump during rotation of the camshaft through the plurality of revolutions.

* * * * *